United States Patent
Schmookler

(10) Patent No.: US 6,178,435 B1
(45) Date of Patent: Jan. 23, 2001

(54) METHOD AND SYSTEM FOR PERFORMING A POWER OF TWO ESTIMATION WITHIN A DATA PROCESSING SYSTEM

(75) Inventor: Martin Stanley Schmookler, Austin, TX (US)

(73) Assignee: International Business Machines Corporation, Armonk, NY (US)

(*) Notice: Under 35 U.S.C. 154(b), the term of this patent shall be extended for 0 days.

(21) Appl. No.: 09/106,944

(22) Filed: Jun. 30, 1998

(51) Int. Cl.[7] ...................................................... G06F 7/38
(52) U.S. Cl. ........................... 708/277; 708/495; 708/512
(58) Field of Search ..................................... 708/277, 512, 708/517, 606, 495

(56) References Cited

U.S. PATENT DOCUMENTS

| | | | | |
|---|---|---|---|---|
| 4,583,180 | * | 4/1986 | Kmetz | 708/204 |
| 5,197,024 | * | 3/1993 | Pickett | 708/517 |
| 5,365,465 | * | 11/1994 | Larson | 708/204 |
| 5,524,089 | * | 6/1996 | Takano | 708/517 |
| 5,570,310 | * | 10/1996 | Smith | 708/517 |
| 5,652,584 | * | 7/1997 | Yoon | 341/89 |

\* cited by examiner

*Primary Examiner*—Chuong Dinh Ngo
(74) *Attorney, Agent, or Firm*—Casimer K. Salys; Felsman, Bradley, Vaden, Gunter & Dillon, LLP

(57) ABSTRACT

A method for performing a power of two estimation on a floating-point number within a data processing system is disclosed. The floating-point number includes a sign bit, multiple exponent bits, and a mantissa having an implied one and multiple fraction bits. In order to estimate the power of two of the floating-point number, the mantissa is partitioned into an integer part and a fraction part, based on the value of the exponent bits. A floating-point result is formed by assigning the integer part of the floating-point number as an unbiased exponent of the floating-point result, and by converting the fraction part of the floating-point number via a table lookup to become a fraction part of the floating-point result.

6 Claims, 3 Drawing Sheets

METHOD AND SYSTEM FOR PERFORMING A POWER OF TWO ESTIMATION WITHIN A DATA PROCESSING SYSTEM

RELATED PATENT APPLICATION

The present patent application is related to a copending application U.S. Ser. No. 09/106,942 filed on even date, entitled "METHOD AND SYSTEM FOR PERFORMING A LOGARITHMIC ESTIMATION WITHIN A DATA-PROCESSING SYSTEM" (IBM Docket No. AT9-98-064).

BACKGROUND OF THE INVENTION

1. Technical Field

The present invention relates to a method and system for data processing in general, and in particular to a method and system for performing a numerical estimation within a data processing system. Still more particularly, the present invention relates to a method and system for performing a power of two estimation within a data processing system.

2. Description of the Prior Art

An exponential function, such as a power of two function, is commonly encountered in graphical applications. However, many processor cycles are typically required for the execution of an exponential function in a general purpose processor that does not have an exponential function in its instruction set. Even for processors having an exponential function in their instruction set, several processor cycles are required to execute an exponential function via microcode.

In view of the above, the present disclosure describes a fast implementation of a power of two function, i.e., $y=2^x$, for a general purpose processor, where both the argument x and the result y are represented in a floating-point format. Without loss of generality, the floating-point format used for the purpose of illustration is the IEEE 754 format. Due to the nature of the power of two function, the practical range of values of argument x is typically restricted to a very small portion of the normal range, otherwise result y will fall outside the representable range of values.

SUMMARY OF THE INVENTION

In view of the foregoing, it is therefore an object of the present invention to provide an improved method and system for data processing.

It is another object of the present invention to provide an improved method and system for performing a numerical estimation within a data processing system.

It is yet another object of the present invention to provide an improved method and system for performing a power of two estimation within a data processing system.

In accordance with a preferred embodiment of the present invention, the floating-point number includes a sign bit, multiple exponent bits, and a mantissa having an implied one and multiple fraction bits. In order to estimate the power of two of the floating-point number, the mantissa is partitioned into an integer part and a fraction part, based on the value of the exponent bits. A floating-point result is formed by assigning the integer part of the floating-point number as an unbiased exponent of the floating-point result, and by converting the fraction part of the floating-point number via a table lookup to become a fraction part of the floating-point result.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
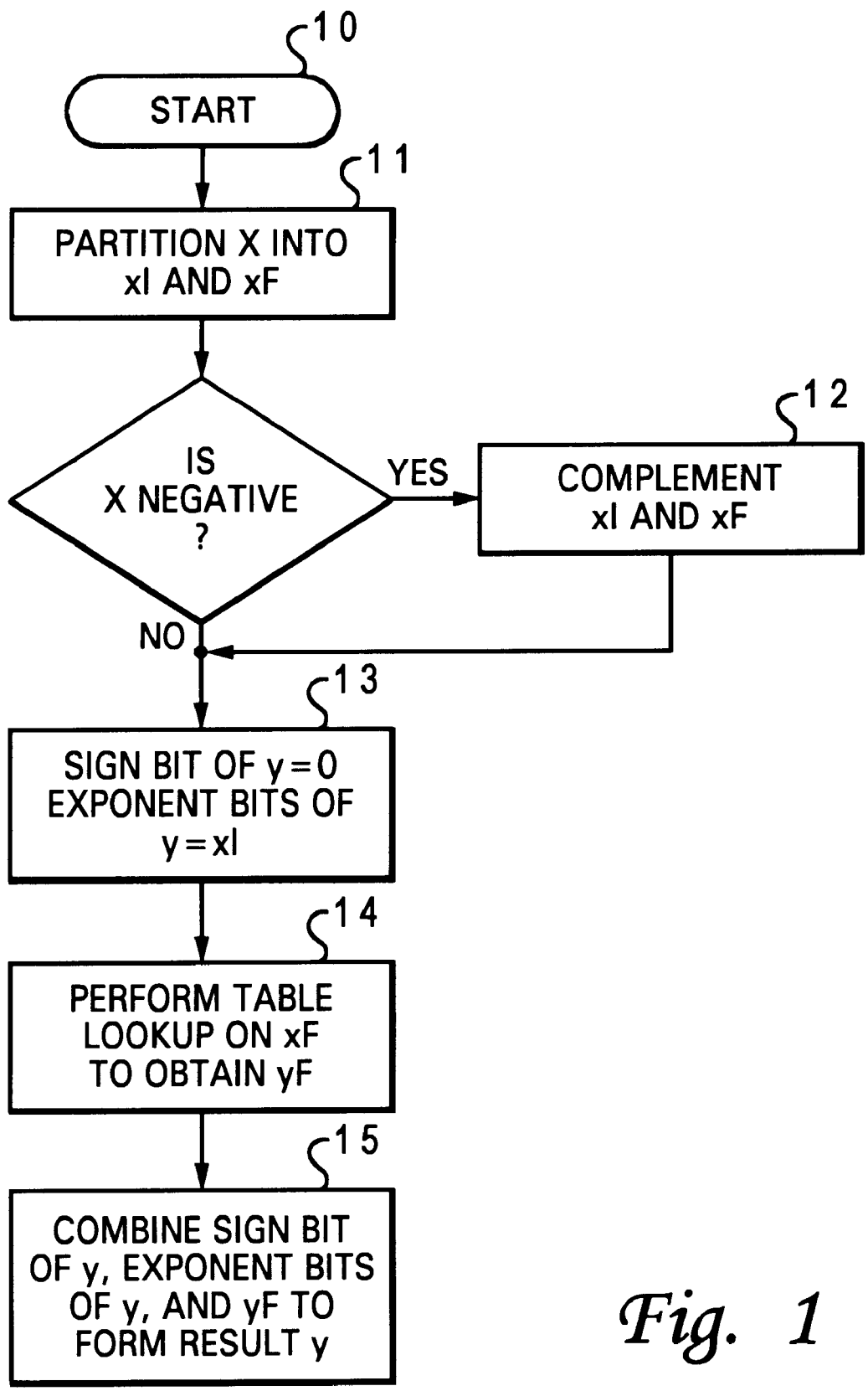
FIG. 1 is a high-level flow diagram illustrating a method for performing a power of two estimation within a data processing system, in accordance with a preferred embodiment of the present invention.

The present invention may be executed in a variety of data processing systems, including microprocessors and microcontrollers. For the purpose of illustration, a preferred embodiment of the present invention, as described below, may be implemented on a PowerPC™ processor manufactured by International Business Machines Corporation of Armonk, N.Y.

A. OVERVIEW

As mentioned previously, one of the objectives of the present invention is to provide a fast implementation of a $y=2^x$ function within a general purpose floating-point processor, where x and y are 32-bit single precision floating-point numbers. According to the IEEE 754 format, a normalized floating-point number, such as x, is represented by three groups of bits, namely, a sign bit, exponent bits, and mantissa bits. The sign bit is the most significant bit of the floating-point number. The next eight bits are the exponent bits, which represent the signed biased exponent of the floating-point number. An unbiased exponent can be obtained by subtracting 127. The 23 least significant bits are the fraction bits; and the mantissa is computed by dividing these 23 bits by $2^{23}$ and adding 1.0 to the quotient.

In accordance with a preferred embodiment of the present invention, the value of a floating-point number x can be partitioned into the sum of two parts, namely, a signed integer xI and a positive fraction xF. With the above partition, xI becomes the unbiased exponent of y, while the mantissa of y is equal to $2^{xF}$. Because $0 \leq xF < 1$, therefore $1 \leq 2^{xF} < 2$. If a graph of $2^{xF}$ (a power of two function) is compared with a graph of $(1+xF)$ (a linear function) within the range of 0 to 1, it is observed that the results from the above two functions are identical at the endpoints, while the results from the $2^{xF}$ function are typically slightly less than the results from the $(1+xF)$ function between the endpoints. This relationship forms the basis for the present invention. Thus, if a power of two function with a low-precision estimation is needed, then the low-precision power of two function can be obtained simply by making small corrections to the linear function. On the other hand, if a power of two function with a higher precision estimation is required, the higher-precision power of two function can be obtained by utilizing a lookup table, sometimes in conjunction with point interpolation as is well-known to those skilled in the art.

With the above-described estimation method, it is apparent that if x is positive with a relatively large magnitude, then $2^x$ will be too large to be represented using the same floating-point format as x. Such cases should be detected so that the result can be set to +∞ (infinity) accordingly. On the other hand, if x is negative with a relatively large magnitude, then $2^x$ will be too small to be represented by the same floating-point format as x also. Thus, such cases should again be detected so that the result can be set to zero accordingly. A third limiting case for the above-described estimation method is when the unbiased exponent of x is negative with a relatively large magnitude. This limiting case occurs when the magnitude of x is very small, and thus the result of $2^x$ will be set to 1.0.

Referring now to the drawings and in particular to FIG. 1, there is depicted a high-level flow diagram illustrating a method for performing a power of two estimation within a data processing system, in accordance with a preferred embodiment of the present invention. Starting at block 10, the mantissa of a floating-point number x is partitioned into a signed unbiased integer xI and a fraction xF, as shown in block 11. The partitioning is determined from the exponent of x. If the sign of x is negative, the partitioned mantissa is replaced by its 2's complement, as depicted in block 12. After this step, the integer portion is a signed integer, xI, but the fraction part is a positive value xI. Subsequently, the sign of y is set to 0, corresponding to a positive value, since $2^x$ must be non-negative; and the value xI becomes the unbiased exponent of y, as illustrated in block 13. The biased exponent can be obtained by adding 127 if xI is within the normal range of −126 to +127. The fraction part of the mantissa of y, yF, is then obtained via a lookup table utilizing fraction xF as input, as illustrated in block 14. Finally, the floating-point result y can be formed by combining the sign bit of y, the exponent bits of y, and the fraction bits of y, as shown in block 15.

Figure 2:
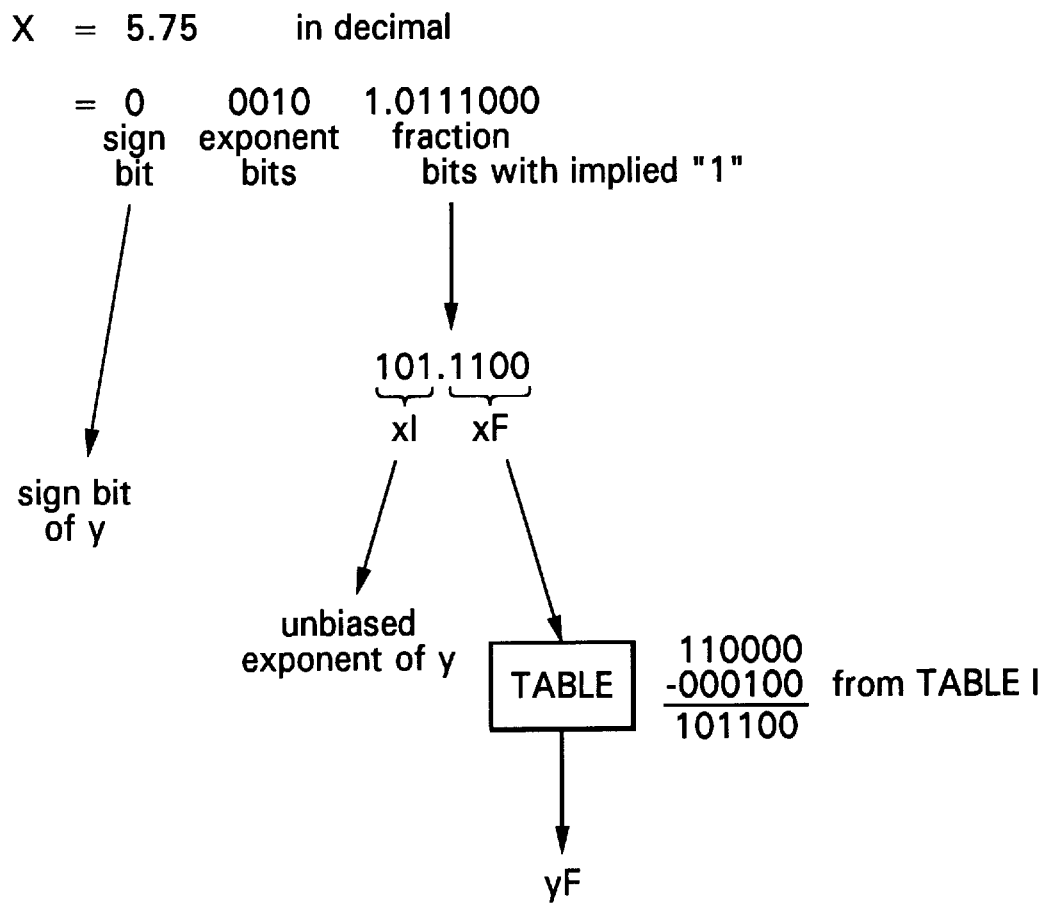
FIG. 2 is an example illustrating a method for performing a power of two estimation within a data processing system, in accordance with a preferred embodiment of the present invention.

With reference now to FIG. 2, there is depicted an example illustrating a method for performing a power of two estimation within a data processing system, in accordance with a preferred embodiment of the present invention. Suppose x equals 5.75 in decimal. Then x can be represented in a floating-point format, as follows:

$$(-1)^{sign}*2^{exp}*\text{mantissa}$$

where sign is a sign bit, exp is a positive unbiased exponent, and mantissa is equal to 1.fraction. Thus, $x=(-1)^0*2^2*1.011100$ or 0 0010 0111 0000 in floating-point binary. Because the exponent of x equals 0010 (or 2 decimal), the implied binary point is shifted two positions to the right, such that the mantissa becomes 101.110000. The bits to the left of the binary point (i.e. 101) becomes an integer part xI, and the bits to the right of the binary point (i.e., 110000) becomes a fraction xF. Thus, $y_{exp}$ (the unbiased exponent of the floating-point result y) equals 101; and yF (the fraction of the floating-point result y) equals 101100 by utilizing a table lookup (such as Table I shown below) with fraction xF as an input. The value of floating-point result y is obtained by combining $y_{exp}$ and yF to yield 110110.000 in binary or 54 in decimal. The error of this estimated floating-point number y is +0.34% when compared with 53.8174 (the precise result of $2^{5.75}$), which is quite acceptable for most applications.

B. IMPLEMENTATION

Figure 3:
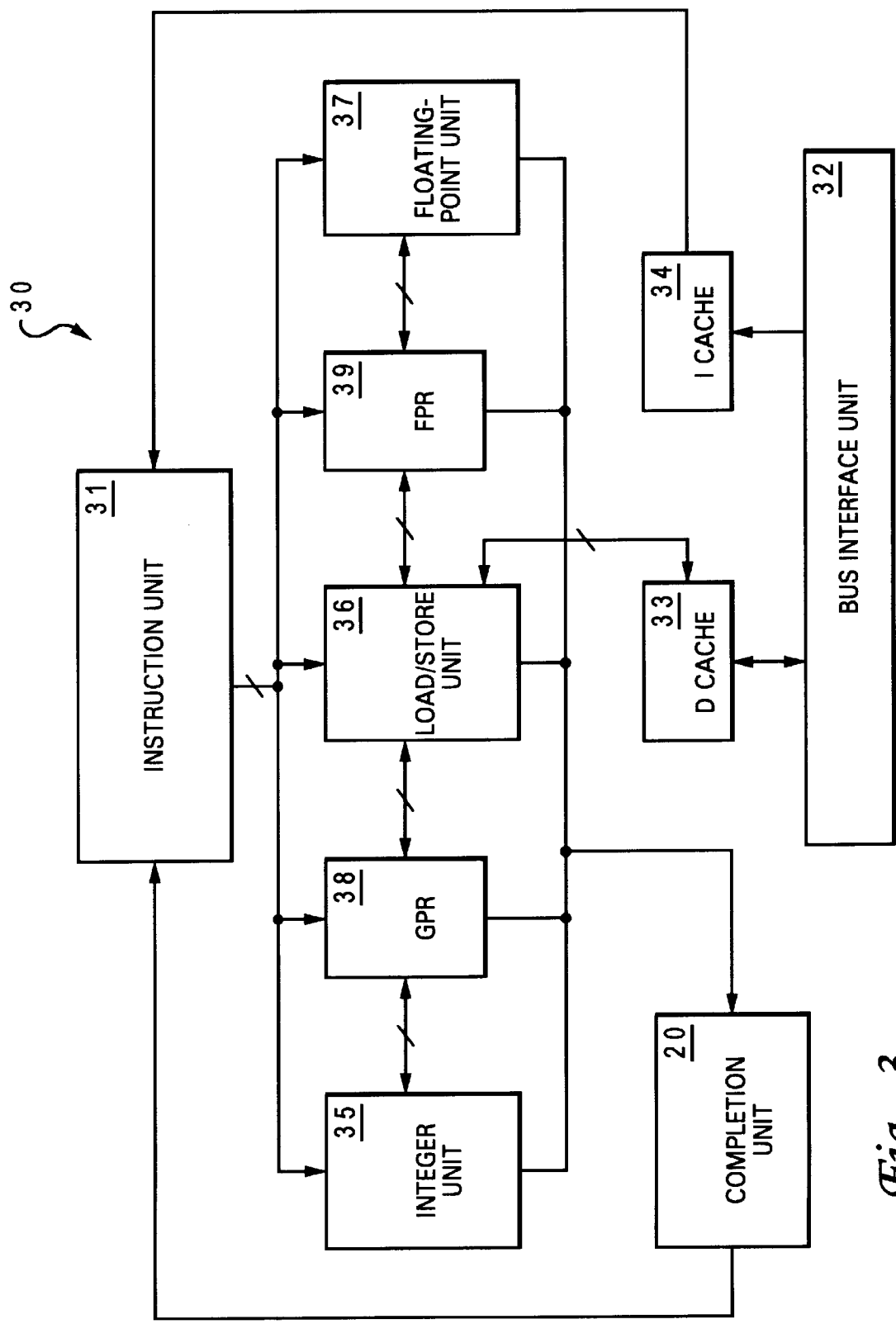
FIG. 3 is a block diagram of a general purpose processor in which a preferred embodiment of the present invention may be incorporated.

Referring now to FIG. 3, there is depicted a block diagram of a general purpose processor in which a preferred embodiment of the present invention may be incorporated. Within a processor 30, a bus interface unit 32 is coupled to a data cache 33 and an instruction cache 34. Both data cache 33 and instruction cache 34 are high speed set-associative caches which enable processor 30 to achieve a relatively fast access time to a subset of data or instructions previously transferred from a main memory (not shown). Instruction cache 34 is further coupled to an instruction unit 33 which fetches instructions from instruction cache 34 during each execution cycle.

Processor 30 also includes at least three execution units, namely, an integer unit 35, a load/store unit 36, and a floating-point unit 37. Each of execution units 35–37 can execute one or more classes of instructions, and all execution units 35–37 can operate concurrently during each processor cycle. After execution of an instruction has terminated, execution units 35–37 store data results to a respective rename buffer, depending upon the instruction type. Then, any one of execution units 35–37 can signal a completion unit 20 that the instruction execution is finished. Finally, instructions are completed in program order by transferring result data from the respective rename buffer to a general purpose register 38 or a floating-point register 39, accordingly.

The present invention can be incorporated within the floating-point data flow of processor 30, such as the floating-point multiply-add function contained within floating-point unit 37. In addition, the steps described herein can be pipelined to enable a new instruction to begin at every cycle, as long as the new instruction is not delayed by a data dependency on a previous instruction.

A exemplary method for performing a power of two estimation within processor 30 is implemented by the following steps:

Step 1: Shift the mantissa of x to the right until the first eight bit positions contain only the integer part of x (i.e., xI), and the remaining bit-positions of the mantissa contain the fractional part of x (i.e., xF). In other words, the mantissa of x is right shifted by $(8-x_{exp})$ bit-positions, where $x_{exp}$ is an unbiased exponent (i.e., $x_{exp}=x_{bias\ exp}-127$). Thus, the number of bit-positions required to right shift the mantissa of x is determined entirely by the exponent of x, and, in this example, a maximum of eight bit-positions are needed for the integer part of x. An alignment shifter, which is typically employed to align operands for floating-point additions, can be utilized to perform the right shift. The entire result after the right shift will be referred to as x_shift.

If the integer part xI is too large to be represented by eight bits, then one of the limiting cases previously described will apply, and the result will be set to either +∞ or zero. For example, if x is positive (sign bit of x equals 0), then y will be set to +∞. Or, if x is negative (sign bit of x equals 1), then y will be set to zero. If $x_{exp}$ is less than −15, then x_shift equals zero, and y will be set to 1.0. (note: xI is not "signed" until after step 2. Also, $x_{exp}$ must be less than 7, otherwise xI would be too large.)

Step 2: Complement x_shift if x is negative, and the result is known as a x_align. This can be accomplished by utilizing the means that is typically provided for subtraction purposes. This step produces a positive fraction part (xF) as well as an integer part (xI) that is now in two's complement form, which is similar to the biased representation needed for the exponent of y.

Step 3: Obtain the fraction yF of y utilizing a lookup table. The precision of the result depends on the precision of the entries within the lookup table. Table I, for example, produces a yF with approximately four bits of precision. There is an implied "1" bit and binary point associated with the mantissa of y. This result may be denormalized afterwards, based on the exponent result obtained from Step 4.

TABLE I

| x_align[9:14] | yF[1:12] |
|---|---|
| 000*** | yF[1:4] = 0000; |
|  | yF[5:23] = x_align[12:30] |
| 1101** | yF[1:6] = x_align[9:14] − 000011 |
| 1110** | yF[1:6] = x_align[9:14] − 000010 |
| 11110*, 111110 | yF[1:6] = x_align[9:14] − 000001 |
| 111111 | yF[1:6] = 111111 |
| all other cases | yF[1:6] = x_align[9:14] − 000100 |

In Table I, each "*" in the x_align[9:14] column means the bit in that position may be either 0 or 1. Also, unless explicitly shown, yF[7:23]=x_align[15:31].

Step 4: The unbiased exponent of y (yI) equals x_align [2:8]. The biased exponent of y may be obtained by adding 127. This addition can be performed by utilizing an exponent adder that is typically needed for adjusting an exponent after normalization.

Referring now to Table II, there is depicted a comparison of the results between the estimation method of the present invention and the conventional method. All the results in Table II are in eight-bit precision. Note that the estimated results are very close to the results calculated by the conventional method. The conventional method produces the precise result rounded to 8-bit of the fraction.

TABLE II

| x_align[9:16] | 1.yF[1:8] | conventional method |
|---|---|---|
| 0000 0000 | 1.0000 0000 | 1.0000 0000 |
| 0000 1000 | 1.0000 0100 | 1.0000 0110 |
| 0000 1111 | 1.0000 0111 | 1.0000 1011 |
| 0001 0000 | 1.0000 1000 | 1.0000 1011 |
| 0001 1000 | 1.0000 1100 | 1.0001 0010 |
| 0001 1111 | 1.0000 1111 | 1.0001 0111 |
| 0010 0000 | 1.0001 0000 | 1.0001 0111 |
| 0011 0000 | 1.0010 0000 | 1.0010 0100 |
| 0100 0000 | 1.0011 0000 | 1.0011 0000 |
| 0101 0000 | 1.0100 0000 | 1.0011 1110 |
| 0110 0000 | 1.0101 0000 | 1.0100 1100 |
| 0111 0000 | 1.0110 0000 | 1.0101 1011 |
| 1000 0000 | 1.0111 0000 | 1.0110 1010 |
| 1001 0000 | 1.1000 0000 | 1.0111 1010 |
| 1010 0000 | 1.1001 0000 | 1.1000 1011 |
| 1011 0000 | 1.1010 0000 | 1.1001 1100 |
| 1100 0000 | 1.1011 0000 | 1.1010 1111 |
| 1101 0000 | 1.1100 0100 | 1.1100 0010 |
| 1110 0000 | 1.1101 1000 | 1.1101 0110 |
| 1111 0000 | 1.1110 1100 | 1.1110 1010 |
| 1111 1000 | 1.1111 0100 | 1.1111 0101 |
| 1111 1111 | 1.1111 1111 | 1.1111 1111 |

As has been described, the present invention provides an improved method and system for performing a power of two estimation within a data processing system. A six-bit precision implementation is described in this disclosure, but it is well understood to those skilled in the art that higher precision estimation can easily be obtained by utilizing the same principle as disclosed. Notice however, that despite the use of relatively low precision, if the fraction of x equals zero, then the disclosed method will always produce the precise result, unless the precise result cannot be represented in the allowed floating-point format. In addition, the disclosed method produces a monotonic result, despite the low precision, and this may be important for certain applications.

While the invention has been particularly shown and described with reference to a preferred embodiment, it will be understood by those skilled in the art that various changes in form and detail may be made therein without departing from the spirit and scope of the invention.

What is claimed is:

1. A method for executing a floating-point instruction, said method comprising the steps of:

storing a floating-point number within a memory of a data processing system having a processor, wherein said floating-point number includes a sign bit, a plurality of exponent bits, and a mantissa having an implied one and a plurality of fraction bits;

in response to a floating-point instruction:
      partitioning said mantissa into an integer part and a fraction part, based on said exponent bits; and
      yielding a floating-point result by assigning said integer part of said floating-point number as an unbiased exponent of said floating-point result, and by converting said fraction part of said floating-point number via a table lookup to become a fraction part of said floating-point result; and storing said floating-point result in said memory.

2. The method according to claim 1, wherein said method further includes a step of complementing said integer part and said fraction part of said floating-point number if said floating-point number is negative.

3. The method according to claim 1, wherein said method further includes a step of adding 127 to said unbiased exponent of said floating-point result to form a biased exponent of said floating-point result.

4. A processor capable of performing a power of two estimation on a floating-point number, wherein said floating-point number includes a sign bit, a plurality of exponent bits, and a mantissa having an implied one and a plurality of fraction bits, said processor comprising:

means for partitioning said mantissa into an integer part and a fraction part, based on said exponent bits; and means for yielding a floating-point result by assigning said integer part of said floating-point number as an unbiased exponent of said floating-point result, and by converting said fraction part of said floating-point number via a lookup table to become a fraction part of said floating-point result.

5. The processor according to claim 4, wherein said processor further includes a means for complementing said integer part and said fraction part of said floating-point number if said floating-point number is negative.

6. The processor according to claim 4, wherein said processor further includes a means for adding 127 to said unbiased exponent of said floating-point result to form a biased exponent of said floating-point result.

* * * * *